3,644,294
PROCESS AND EQUIPMENT FOR THE CONTINUOUS PRODUCTION OF POLYESTERS
Francesco Siclari, Cesano Maderno, and Franco Magnoni, Milan, Italy, assignors to Snia Viscosa Societá Nazionale Industria Applicazioni Viscosa S.p.A., Milan, Italy
Filed Apr. 4, 1969, Ser. No. 813,628
Claims priority, application Italy, Apr. 11, 1968, 15,146/68
Int. Cl. C08g *17/001*
U.S. Cl. 260—75 M        14 Claims

ABSTRACT OF THE DISCLOSURE

A process for continuous production of a spinnable polyester including a plurality of steps of precondensation and of progressive condensation accompanied by removal of gaseous co-products. The individual steps are carried on applying thin-layer technique within separate environments at differing temperature and pressure conditions and wherein the walls defining said environments are so heated to maintain the temperature gradient at the interface of wall and liquid thin layer within a small value preferably not greater than 6° C., and the said liquid thin-layer in each environment prevailingly consists of partially reacted product recycled in same environment. An equipment comprising a plurality of reaction environments, recycling means and surface heat-exchanging means for carrying out the process.

---

Figure 1:
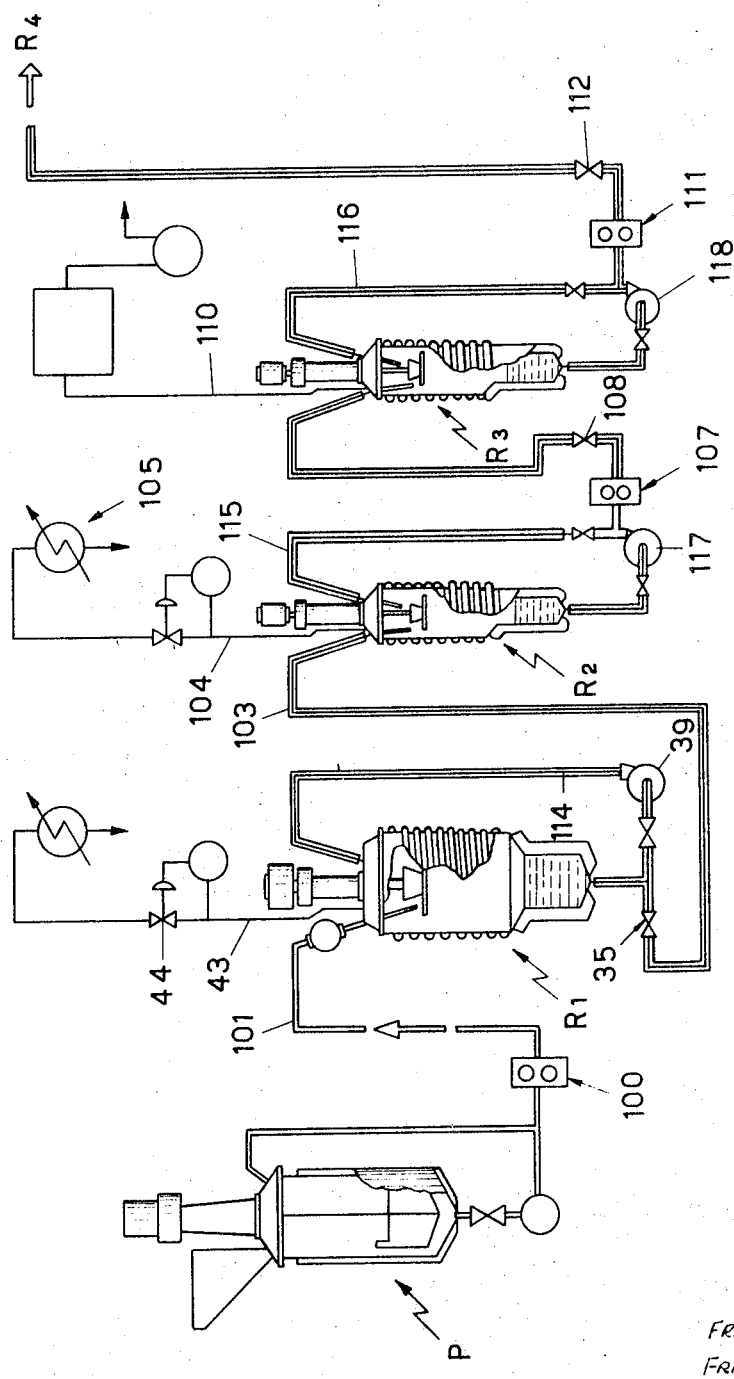

The present invention refers in general to the continuous production of polyesters. More particularly it refers to a process and also the equipment for the execution of the said process, and able to effect such a production with numerous advantages.

The process according to the invention is advantageously utilisable for the production of polyesters, obtainable from monomers or oligomers which are obtained in their turn either by esterification of an alkene glycol, in particular ethylene glycol, with an aromatic dicarboxylic acid, for example terephthalic acid, or by means of transesterification of diesters of dicarboxylic acids, for example dimethylterephthalate with an alkene glycol, in particular ethylene glycol. In the known processes, the reactions of polycondensation are generally effected in successive phases, which are conventionally distinguished as "precondensation" and "final polycondensation." The invention has particular affinity with the phases of esterification, or of transesterification, and of precondensation, phases which have well known characteristics in common, in particular resulting in the liberation of volatile compounds such as water and alcohol.

Such processes for the production of polyesters, even continuous, are well known in the technology of the branch. According to known processes, the initial acid or diester is introduced continuously with the alkene glycol, typically ethylene glycol, into one or more reactors, in which an intermediate compound is produced, generally defined by the expression "prepolymer."

Such prepolymers are then transferred through apparatus for final polycondensation, in which the process of polycondensation is pushed in one or more stages until the desired molecular weight, is reached as required for effecting the extrusion of the final products, in particular polyester fibres for textile uses. According to the best technology, the known equipment for the continuous production comprises a sequence of different apparatus, in particular one or more reactors for esterification and transesterification, one or more reactors for precondensation and one or more apparatus for final polycondensation, in which are included mechanical equipment, such as screw conveyors, for the mixing, treatment and conveying of the product.

In order to ensure the regular working of the processes and of the chemical reactions bringing about the esterification (or transesterification) of the acid (or of the diester) with a glycol, and then the polycondensation, in particular precondensation of the monomer ester so obtained, it is necessary to observe numerous conditions and take into account numerous factors. Such conditions and factors are well known to the experts of the field and an extensive discussion with regard to this is superfluous. Moreover, it is noted, in general, that the conditions under which the condensation and, in greater measure, the reaction of esterification or of transesterification can come about, include energetic thermal exchanges, both in order to ensure the amount of energy needed for the reaction, and in order to obtain the necessary transformations of physical state, for which to be effective the volatile products which form during the course of a reaction must be removed. Other factors to take into account are the necessity of ensuring the necessary movements of mass, the homogeneousness of the reaction masses, and so on.

Also to be observed, within the limits of possibility, are conditions which impede or at least sufficiently limit the production of secondary reactions, such as for example the formation of polyglycols.

It is noted in fact that the introduction of the diglycol in place of the glycol into the polymer chain constitutes an element of breakdown of the structural regularity of the polyester, as is confirmed by the depression of the melting point. Such a damaging phenomenon has repercussions on the polymer and on the fibres produced from this, from diverse aspects (mechanical, dyeing and others) all as well known in the technology of the branch.

For a better understanding of the suppositions and the purposes of the present invention, it is considered convenient to start with a discussion and an analysis of the chemical reactions considered in the invention itself and of the conditions under which these can come about. The analysis which follows will be made with particular reference to the reactions of esterification of terephthalic acid with ethylene glycol.

For the nature of the present invention, and for a better understanding of its characteristics and purposes, reference will be made repeatedly in the following to the concept of "regime" in particular of "thermal regime" of the reactions considered. It should be noted that, for the interpretation of this concept, the criteria and definitions adopted are those expounded in the book "Pilot Plants, Models and Scale-up Methods in Chemical Engineering" Chapter 6, (McGraw Hill series in Chemical Engineering) Editor McGraw Hill, New York, 1957.

It is noted that for these reactions, and for the reactions of esterification of terephthalic acid in particular an extremely energetic mass transfer is required.

As the product which determines the fluidity of the reaction mass is the glycol, and as the terephthalic acid is a solid and practically insoluble both in the glycol and in the prepolymer, in industrial practice one must operate with an excess of glycol as is proposed in the technology of the branch. This gives rise to the necessity of operating with very strong agitation in order to get the acid into the reaction condition.

The reactors used in practice are in general apparatus in which much importance is given to the efficiency of the agitation system (autoclaves or others). Normally under these conditions one can have the following situations.

(a) Agitation which is extremely energetic and satisfies the necessity of mixing the reagents. Further, as a consequential fact, this allows a high thermal exchange with the heated walls, by which means there is ready evaporation of the volatile component. In this case the velocity of the process is that of the true chemical reaction, expressed in terms of kinetic chemistry, that is of the law of mass action and activation energy; and thus the reaction takes place in the chemical regime.

(b) Mixing of the reagents which is not sufficient to put them into such intimate contact that they can react in conditions in which the reaction itself would be kinetically favoured. In this case one operates in the engine of mass transfer that is where the velocity of the process is a function of the fluid dynamic parameters of the reaction system (velocity, viscosity, density, etc.).

However, regarding the secondary process viz, the formation of the diglycol (polyesterification), it is noted that in nearly all the reaction systems, this takes place in the chemical regime, that is, it is favoured by elevated concentrations of free glycol and by high temperatures and retention times.

The choice of conditions therefore must result in a compromise between those which favour the principal process and those which inhibit the secondary reaction.

The conditions of mass transfer phenomena necessary for the reaction to proceed with elevated velocity give rise to the necessity of working with mixtures which are relatively fluid, and thus with an excess of glycol, or with stoichiometric quantities for obtaining the monomer ester. This however favours, because of mass action, also the formation of the diglycol.

The excess of glycol in addition favours the formation of the diglycol also when the reaction proceeds in the chemical regime, because the mass action is applied to both processes, the principal and the secondary.

When in order to reduce the occurrence of the secondary process a deficiency of glycol is fed with respect to the stoichiometric quantity for the monomer (either for economical motives or in order to reduce the concentration of free glycol) the times required for the reaction increase, both because of the diminished mass action and further because of the lesser fluidity of the system.

Experience also shows that a prolongment of the reaction times hinders production.

Noted technology in fact acts under conditions which are always in one way or another unfavourable.

Other parameters, factors and conditions, which influence the industrial application of the invention, will be mentioned and if necessary briefly commented upon in the description which follows.

With this premise, the object of the present invention is the solution of the technical problems and the obtaining of surprisingly favourable conditions, in which the negative influences of the factors previously considered are practically eliminated.

Essentially, the process according to the invention comprises (1) the formation and the maintaining at the entrance to the apparatus and in the apparatus itself where the reactions take place, of an intimately mixed mass of feed compounds (initial mixture or prepolymer) and of the reacted product, and in which mass the said reacted product represents the most prevalent fraction (at least five times the quantity of the said compounds), (2) the distribution of the said mixture in the form of a liquid film in contact with an area which transfers by conduction and convection the thermal energy necessary for the reactions, and for the transformation of state of the volatile products, (3) the collection of the reacted products at the exit of the said apparatus, and (4) the continuous extraction of the said product in two streams, one an exit stream at a rate of flow corresponding to the rate of feed of the said compounds and the second, at least five times greater than the first, recirculated back to the said entrance, for the reformation of the said mixture and of the said liquid film.

These and other objects, advantages and characteristics of the invention will easily appear in the course of the detailed description which follows of a preferred but not exclusive method of carrying it out.

Figure 2:
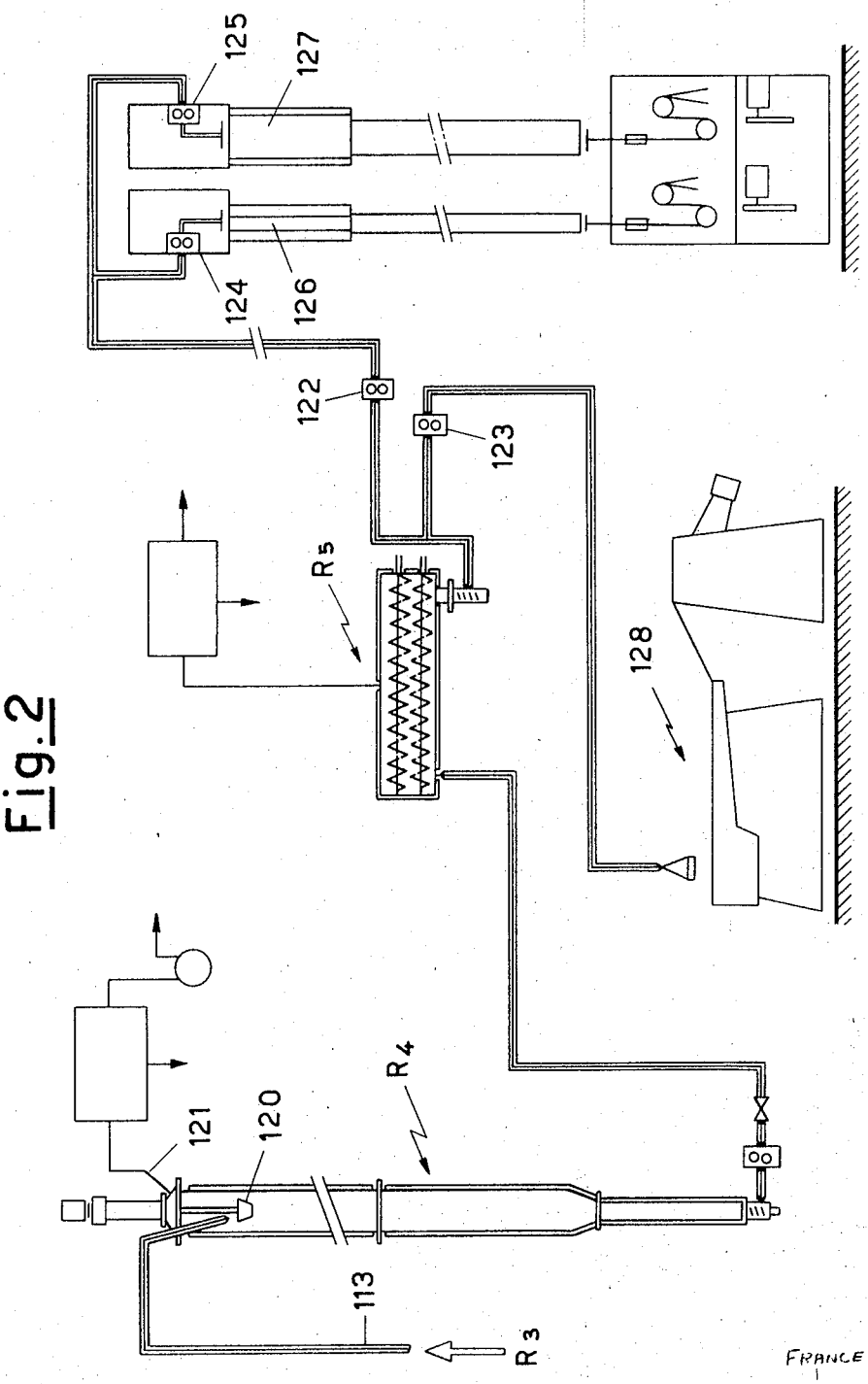
Figure 3:
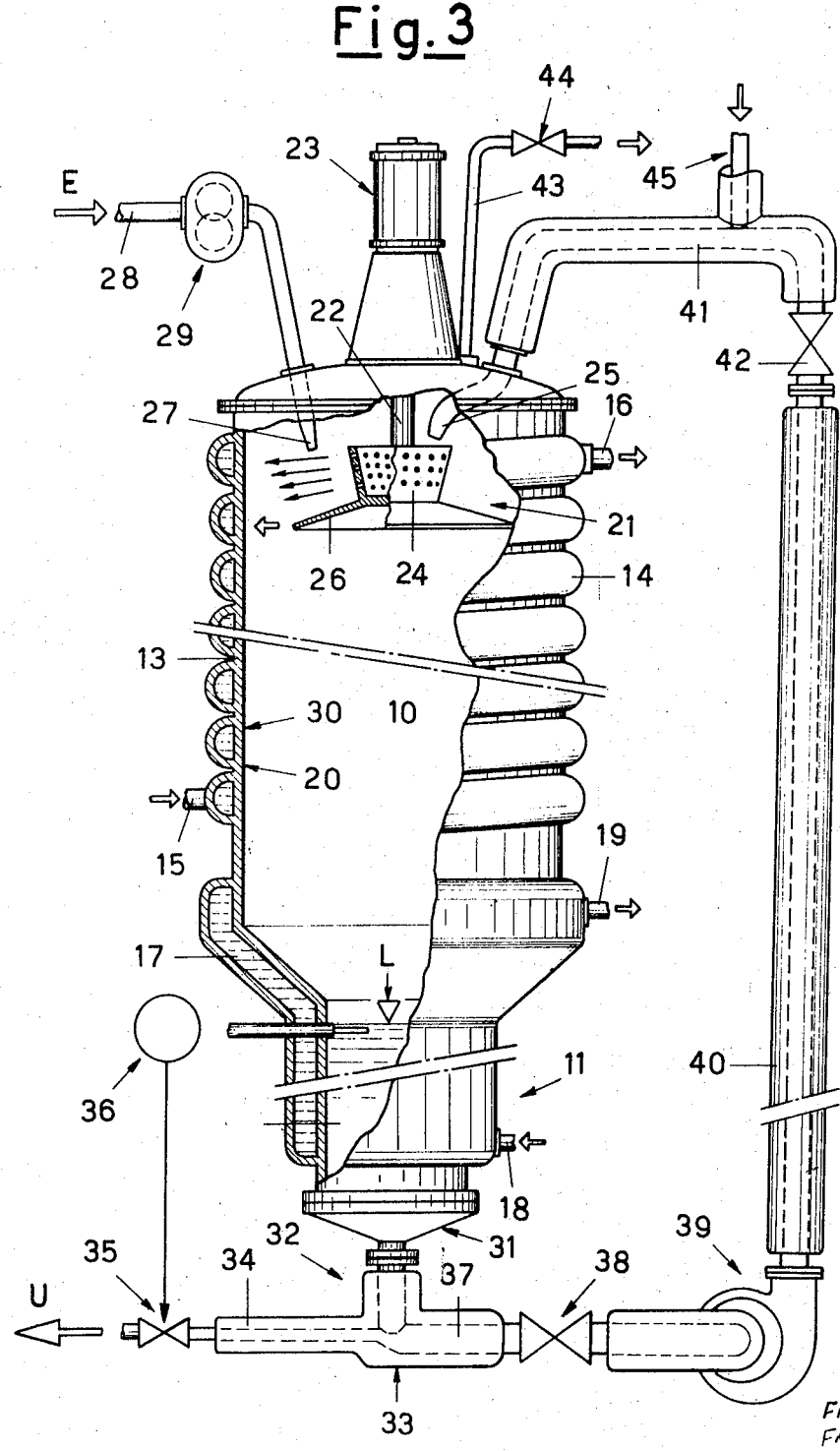
Figure 4:
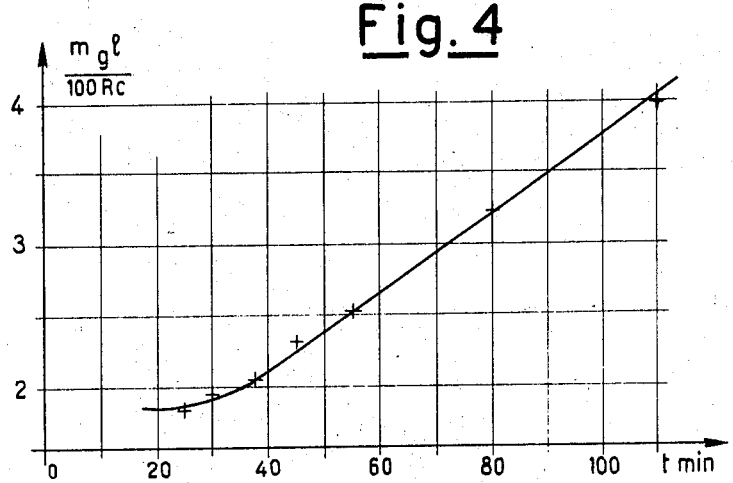
Figure 5:
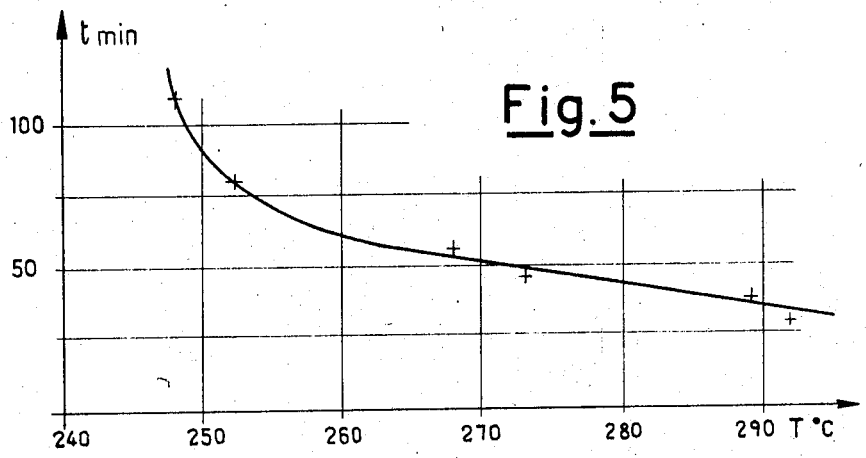
Figure 6:
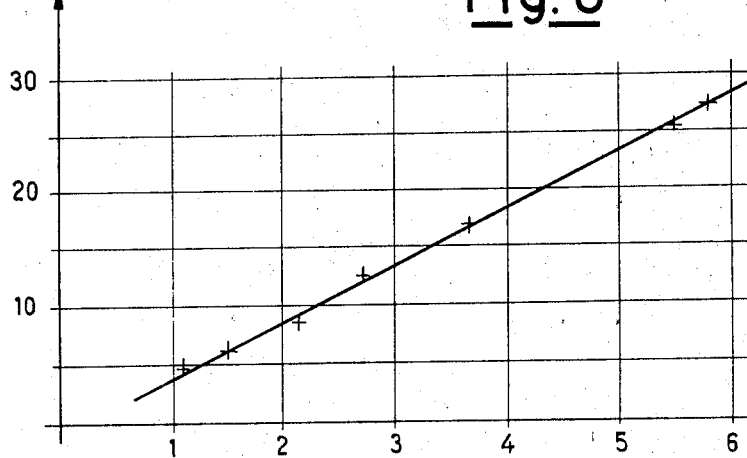

The description refers to the attached drawings which schematically reproduce the equipment which is the object of the invention and in which:

FIG. 1 represents schematically the initial part of the equipment including a sequence of reactors operating under the conditions initially indicated, and from the combination of which a precondensate is obtained;

FIG. 2 similarly represents the final part of the equipment, in which the polycondensation is completed, the said figure including examples of possible utilisation of the polyester so obtained for the obtainment of industrial and textile products;

FIG. 3 represents partially in elevation and partially in section, and in more detail, one of the reactors forming the initial part of the equipment, and specifically the esterification or transesterification reactor which mostly responds to the initial conditions mentioned; and FIGS. 4, 5 and 6 are graphical representations which demonstrate conditions, which will be commented upon later, under which the parameters and values most favourable to the obtainment of the best technical and industrial results of the invention can be achieved and thus pre-chosen.

The theme of the process and the relative advantages will be described and commented upon in what follows, assuming the use of equipment as identified in FIGS. 1 and 2 and comprising as its most characteristic components reactors of the type exemplified in FIG. 3.

As can be observed in FIG. 1, the equipment comprises on the whole a device P for the preparation of the mixture of the feed materials (terephthalic acid, glycol, dimethylterephthalate, possibly favourable additives and catalysts) and a sequence of reactors R1, R2 and R3 for esterification or transesterification and for initial condensation, obtaining for example a precondensate at the outlet of the reactor R3 whose grade of polycondensation lies between 15 and 25.

This precondensate is transferred to the final part of the equipment, as represented in FIG. 2, and which includes for example a further reactor R4 in which the polycondensation proceeds until a polymer is obtained whose intrinsic viscosity lies between 0.20 and 0.40 (grade of condensation 25 to 45). After the reactor R4 the equipment includes, according to known technology, at least one finishing reactor R5 of for example the screw conveyor type, in which the polymer, which has reached the desired molecular weight, is conveyed by means of feeding devices (122 to 125) to a combination of user devices, for example spinning heads 126 and 127, extrusion heads 128 and others. This final part of the equipment does not require further detailed description, as it is not characteristic of the invention, and is realized and functions as an application of currently known techniques of the art.

As can be observed from FIG. 1, the feed mixture, by means of a volumetric pump 100 and a suitable pipeline 101, is fed to the first reactor R1 for esterification or transesterification. In the course of this first reaction, which can reach for example a grade of at least 90%, a certain amount of prepolycondensation is also produced, with an average grade of from 3 to 10. The process brings about the release of water and alcohol and at the same time of gaseous glycol. The volatile products are extracted continuously in a vapour state through a line 43 and a condensation and recovery device 45 and preferably the glycol is recovered and reintroduced into the reactor, the working conditions of which will be described later.

By way of a flow control valve 35 and a line 103, the ester or more exactly the oligomer is transferred to the second reactor R2 in which the esterification or transesterification is practically completed (reaching for example 98%) and the polycondensation progresses for example up to a grade lying between 10 and 15. This second reactor is provided with its system 104 for evacuation of the gaseous products, preferably associated with a condensation and recovery device 105. The reactors can be provided with means for the introduction for example by way of volumetric pumps, of possible catalysts and additives, possibly in solution or in suspension in small quantities of glycol.

By means of a volumetric pump 107, and valve 108 and a pipeline 109, the prepolymer is fed to the third reactor R3, which is also provided with a system for evacuating the gaseous products 110, and from which, by means of a volumetric pump 111 and a valve 112, the precondensate whose grade can lie between 15 and 25 is fed through a transfer line 113 to the first reactor of the final part of the equipment R4 (FIG. 2).

As can be observed from FIG. 1, each of the reactors for esterification and initial condensation include a circuit 114, 115 or 116 respectively, fed by a pump 39, 117 or 118, respectively, by which part of the intermediate product emerging from the outlet of the respective reactor is recycled to the upper part of it, in which a suitable device, a preferred example of which will later be described with reference to FIG. 3, ensures the projection of the said intermediate product, together with the starting materials, or with the intermediate product coming from the previous reactor, on the upper part of the metallic walls of the reactor, along which the said materials and products trickle in the form of a liquid film, absorbing heat from the said walls.

Each of the said reactors corresponds substantially, with the exception of certain specific secondary details, to the reactor represented in FIG. 3. This reactor comprises an upper chamber 10 and a lower chamber 11, with metallic walls and preferably cylindrical and coaxial. The intermediate material obtained from the reaction is collected in a mass 12 maintained at a given level L, in the said lower part 11.

The metallic walls 13 of the part 10 are heated for example by means of a coil or serpentine 14 in which a suitable thermal transfer liquid circulates at high velocity, such as diphenyl or similar liquid, suitable for rapidly giving up large quantities of heat to the said walls 13, maintaining the internal area 20 at a temperature slightly above that which the reaction mass must have at each of its points. The thermal exchange is controlled by varying the flow of thermal transfer liquid between the inlet 15 and the outlet 16 of the serpentine 14.

The lower part 11 is also heated for example by a corresponding thermal transfer fluid, circulating in an interspace 17 which is provided with an inlet 18 and an outlet 19.

At the top of the chamber 10 there is a device 21 in the shape of a perforated basket 24, supported by a shaft 22 and driven by a motor 23, also fixed to a disc 26, for projecting onto the wall surface 20 of the chamber 10 the intermediate product which emerges from nozzles 25 of the said circuit, or the starting material (or the intermediate product which comes from the previous reactor) emerging from nozzle 27 of the feed system 28, for example by means of a volumetric pump or other means of feeding 29.

In this way the said products projected from the device 21 form a liquid film 30 which trickles in contact with the surface 20 of the metallic wall 13 collecting in the mass 12 at the bottom.

On the bottom of the reactor 31 there is an outlet 32 which branches at 33 into an initial part 34 of the pipeline, which flows to the reactor immediately following the outlet flow U being regulated by valve 35, controlled by a device 36 as a function of the level L of the mass 12 of the intermediate product. The excess flowing from 32, with respect to the material transferred towards U to the following reactor, is fed to the said recycle circuit which is indicated overall by 114, 115, 116 in FIG. 1, and which can with advantage include an initial tract 37, a valve 38, a pump 39 and parts 40 and 41 and a valve 42. All of the different pipelines which start at the outlet of the various reactors are jacketed for reasons of their thermal control.

At the top of the reactor there is an outlet 43 for the products in the gaseous state, controlled by a valve 44, to maintain the desired pressure in the reactor. The recondensed glycol can be readmitted to the cycle by means of an inlet 45 joined to the pipelines of the recycle system outside the enclosed space 10 of the reactor.

Reactors of the type described above or equivalent allow the setting up and maintaining of particularly favourable conditions for the carrying out of the various phases of the process. In particular the energetic thermal transfer which takes place between the heated surface 20 and the liquid film 30 permits the giving up of large quantities of heat at the same time maintaining at a very low level the gradient between the temperature of the surface (which corresponds to the temperature assumed by the molecules of the compounds present in the final layer of the film 30 which is in contact with the said surface) and the minimum temperature which exists at every point of the reaction mass. Further as the said liquid film is of very small thickness, this favours mass heat transfer as the diffusion paths are shortened. In addition such a low temperature gradient means that one can impose on to the reaction mass the highest temperature compatible with prevention of the production of cracking phenomena.

The use of the means described above allows the various phases of the process, particularly the initial phase, to take place under the most favourable chemical and mass transfer conditions, with the thermal exchange conditions tending to accelerate the process, and consequently permits unexpectedly low values of retention times, without qualitatively prejudicing production and without giving rise to secondary reactions and phenomena which are damaging or otherwise undesirable.

The advantages of the invention and the conditions under which the process can be most conveniently combined will be more evident from the examples which follow. Moreover, with the object of better identifying certain initial conditions and certain values which advantageously apply, certain considerations will be initially expounded which are the result of carrying out experimental tests, the results of which are represented in graphical form in FIGS. 4, 5 and 6. Operating with experimental equipment as previously described, and opportunily regulating the temperatures, the amounts of thermal energy, and other factors, the esterification of terephthalic acid with ethylene glycol was proceeded with, feeding the acid and the glycol into a reactor of the type represented in FIG. 3 in the constant ratio of 1:2. The small crosses in the three cartesian diagrams of FIGS. 4 to 6 indicate the values obtained in the different experiments, and the curves therein have been derived by graphical interpolation of said values and consequently indicate the progress of the process, as a function of the different parameters.

In the graph of FIG. 4 the relative curve indicates the magnitude of the secondary process of esterification as a function of the retention time in the reactor. The production of the diglycols is indicated on the ordinate in terms of ($m_{g1}/100\ R_t$) mols of diglycol (polyethers) as a percentage with respect to the terephthalic radicals. The retention time ($t_{min}$) is expressed in minutes on the abscissa.

By limiting the retention time to values not exceeding 60 minutes, the formation of diglycols is maintained at values not greater than 2.5% approximately. Beyond this time, the production of diglycols increases sensibly and, for retention times above 100 minutes this reaches unacceptable values in the order of 4%. It is consequently important to be able to operate rapidly with the object of limiting within desirable values the magnitude of the secondary process of esterification.

In the graph of FIG. 5 the importance of the temperature on rapidity of the carrying out of the principal process is shown. The time ($t_{min}$) expressed in minutes of the completion of the esterification reaction (at least to the value of 95%) is indicated as a function of the temperature (T° C.) expressed in degrees centigrade on the abscissa. The desirable retention times of less than 60 minutes are obtained only by operating at temperatures above 265° C. Lesser temperatures, of the order of 250° C., would give rise to retention times so high as to bring about an excessive level of the secondary esterification reaction (see the graph of FIG. 4). The most favourable carrying out of the principal reaction, is obtained by carrying out the process in a time of the order of 30 minutes, at temperatures in the order of 290° C.

It is necessary to take into account the factor that such temperatures are only slightly less, by a maximum of about 10 to 15° C., than the thermal threshold beyond which the phenomena of cracking or thermal degradation can manifest itself. Consequently, although it is extremely advantageous to operate at relatively high temperatures, interpreted in the sense of average temperature of the mass undergoing reaction (and consequently in the case considered of the liquid film descending along the walls of the reactor) it is necessary that no point of the said mass, and specifically the molecules present in the boundary layer in contact with the heated metal walls, reach a temperature which is far removed from the average desirable temperature.

Operating under the conditions and with the means above described, the reaction, at least as regards the mixture descending in the form of a liquid film along the walls of the reactor, takes place in the thermal regime, that is with the reaction velocity dependent on the velocity of thermal exchange. This condition is confirmed by the graph of FIG. 6 in which the increment of production ($Pr$=kg./h. TPA), expressed in terms of kilograms of terephthalic acid converted in one hour, has been drawn as a function of the difference ($\Delta T$) in degrees centigrade between the temperature of the metallic walls and the average temperature of the liquid film descending, measured by probes.

As the tests according to FIG. 6 were conducted maintaining almost constant both the quantity and the flow of liquid film therefore: the heat exchanged was proportional to the production $Pr$, the retention time of the liquid film was inversely proportional to the production $Pr$; it is demonstrated that the velocity of the esterification process which takes place in the liquid film is proportional to the thermal gradient, and therefore to the velocity of thermal exchange between the wall and the film.

Further, one can summarise and comment on the effects and the advantages resulting from the system of recirculation of the reacted mass described above, for surroundings in which the feed compounds are made to descend in the form of a liquid film in contact with the walls of the reactor:

(a) With the system of recirculation, the concentration of the free glycol is reduced to minimal values, thus slowing down the secondary process of polyesterification because of the diminished mass action.

(b) The system of feeding the reagents or of mixing them into the recirculated mass ensures the fluidity of the mass, because of which the requirements of mass transfer are satisfied even when operating with a stoichiometric deficiency of glycol with respect to the stoichiometric theoretical requirements for the monomer ester;

(c) The possibility of having low thermal gradients between the heating surface and material of the film, and in the material itself allows operation under temperature conditions very near to the pyroltic threshold (in known processes, the gradients are higher, for reasons of the ratio between area and volume, and certain temperatures cannot be exceeded without danger of thermal degradation).

(d) Under these conditions the velocity of the chemical reaction of esterification of the acid is high even in spite of the diminished mass action of the glycol. Consequently the velocity of the process is regulated by the thermal exchange.

The liquid film can be considered as the princpal location of the reaction which takes place in the thermal regime. Moreover, the reaction completes itself, because of the desired extension of the retention time, in the lower mass, such a completion taking place on the whole in the chemical regime.

The reactor in its complex (liquid film plus lower mass) is thus a system whose production capacity, for equal surfaces of thermal exchange and flow rate of recirculation, is proportional to the thermal gradient between the surface and the film.

In the most characteristic field of conditions of the present invention (temperature of the film lying between 265 and 294°) the global retention time decreases with decreasing temperature along a straight line of low gradient (see FIG. 5) and decreases with increase of thermal gradient according to an almost proportional law. In this field the amount of diglycol is held to less than 2.6%, that is to a limit less than that which is typical of the polyesters obtained from terephthalic acid.

Although the previous description has concerned the esterification of terephthalic acid (because in that case the invention gives rise to more apparent advantages with respect to traditional technology), it is to be understood that all that has been said is valid also for the transesterification of dimethylterephthalate even though to a less evident extent (because one works at lesser temperatures).

As far as the successive polycondensation is concerned problems relative to the formation of further diglycol beyond that already formed in the preceding phase do not exist, because it proceeds in the practical absence of free glycol.

Even when the viscosity of the mass begins to be high, the means provided by the invention are advantageous with respect to those know. In fact, with the progress of polycondensation the quantity of heat necessary to evaporate the remaining glycol diminishes to very low values and consequently the thermal exchange assumes gradually a secondary role. Parallel to this however, the resistance of the mass to diffusion and to removal of the glycol, which is a necessary condition for the polycondensation to be able to progress, increases.

Thus one is gradually evolving towards a regime of mass transfer.

The film arrangement is thus further advantageous in that it shortens the diffusion paths and permits elevated evaporation areas, and at the same time it ensures that the process, in the transition phase from one regime to the other, does not undergo slowing down by lack of thermal exchange.

Naturally with the increase in viscosity it is expedient to diminish the ratio of recirculation until it is abolished altogether, in order to avoid excessive film thicknesses.

The retention times are however very low which is a demonstration of the efficiency of the system.

In the examples which follow, the advantages and the technical progress which result from the invention will be demonstrated in its two foreseen principal cases of application, and more precisely in Example 1 the conditions adopted in practice in the case of the continuous production of polyesters will be indicated, the initial phase of which consists of esterification of terephthalic acid with ethylene glycol, while Example 2 considers the case in which the initial phase consists of transesterification of dimethylterephthalate, once again with ethylene glycol.

The values indicated in the examples refer to the following data, indicated with the symbols and referring to the conditions listed below:

$T_m$—temperature of the liquid film, expressed in °C. This temperature has been taken locally and measured by means of inductive analysis. In practice this temperature is identical or extremely near to that of the reaction mass at every other part of the reactor. In effect it must be supposed that the temperature of the liquid film undergoes a small increase in the course of its descent, an increase which can be assumed to have a value lying between 1 and 5° C. The value indicated has consequently the character of average value.

$T_s$—temperature of the metallic surface skimmed by the liquid film. It is evident that the measurement of this temperature presents great difficulty. Consequently the values indicated have been devised analytically on the basis of heat transfer coefficients.

$\Delta T = T_s - T_m$ = average thermal gradient between the liquid film and the temperature of the surface which gives up heat, devised as above.

$T_v$—average temperature measured by measuring instruments, of the thermal transfer fluid (diphenyl) circulating in the interspaces or in the serpentines for heating the walls which are internally skimmed by the liquid film.

$P$—absolute pressure of the inside of the reactors (expressed in absolute atmospheres for reactors R1 and R2 and in mm. Hg for reactors R3 and R4).

$U/S$—ratio of the outlet flow to the flow in the circuit which carries the reacted product to the top of its respective reactor.

$t_s$—retention time (expressed by the relation between the total quantity of product present in the reactor and the outlet flow rate), expressed in minutes.

$G_e$—degree of esterification, expressed by the relationship $$G_e = \frac{\text{acid groups entering} - \text{acid groups in the product leaving}}{\text{acid groups entering}}$$

$G_t$—degree of transesterification expressed by the relationship $$G_t = \frac{\text{methanol distilled}}{\text{theoretical methanol}}$$

$\eta$—intrinsic viscosity (in solution in phenyltetrachloroethane 1:1).

$G_p$—average degree of polycondensation, deduced, in the field of low molecular weights, from the quantity of glycol distilled; for values of $G_p$ greater than 20, this degree has been found instead by the use of low relationships, as a function of the intrinsic viscosity.

EXAMPLE 1

| | Reactor | | | |
|---|---|---|---|---|
| | R1 | R2 | R3 | R4 |
| $T_m$ | 245–294 | 250–289 | 270–290 | 270–290 |
| $T_s$ | 246–300 | 251–290 | 271–296 | 271–296 |
| $T_v$ | [1] 247–330 | 252–330 | 272–300 | 272–305 |
| $\Delta T = T_s - T_m$ | 1–6 | 0.5–5 | 1–6 | 1–6 |
| P | 4–6 ata. | 1–2 ata. | [2] 40–150 | [2] 5–30 |
| U/S | 1/30–1/100 | 1/20–1/80 | 1/5–1/40 | 0 |
| $t_s$ | 100'–20' | 30'–10' | 30'–15' | 40'–10' |
| $G_1$, percent | 97–92 | 99–98 | >99 | >99 |
| $G_p$ | 3–10 | 10–15 | 15–25 | 25–45 |
| $\eta$ | | | 0.15–0.18 | 0.20–0.40 |

[1] For $T_v$ 305 operating with a thermal fluid more heat stable than diphenyl (in the example, a chlorinated diphenyl).
[2] Mm. Hg.

EXAMPLE 2

| | Reactor | | | |
|---|---|---|---|---|
| | R1 | R2 | R3 | R4 |
| $T_m$ | 180–275 | 220–285 | 270–290 | 270–290 |
| $T_s$ | 182–280 | 221–290 | 271–296 | 271–296 |
| $T_v$ | 185–295 | 222–295 | 272–300 | 272–305 |
| $\Delta T = T_s - T_m$ | 1–5 | 0.5–5 | 1–6 | 1–6 |
| P | 1–6 ata. | 1–2 ata. | [1] 140–150 | [1] 5–30 |
| U/S | 1/30–1/100 | 1/20–1/80 | 1/5–1/40 | 0 |
| $t_s$ | 100'–30' | 30'–10' | 30'–15' | 40'–10' |
| $G_t$ | 95–90 | 99–97 | [2] >99 | [2] >99 |
| $G_p$ | 3–10 | 10–10 | 15–25 | 25–45 |
| $\eta$ | | | 0.15–0.18 | 0.20–0.40 |

[1] Mm. Hg.
[2] Percent.

Certain working exemplifications, obtained under the conditions indicated, are given in the example which follows, expressed in tabular form, and in which the quantities are expressed in g./h.

Operating according to Example 1.

| | Trial | | |
|---|---|---|---|
| | a | b | c |
| Contents of the feed mixture: | | | |
| Ethylene glycol | 10,100 | 7,180 | 6,900 |
| Terephthalic acid | 13,500 | 10,700 | 13,200 |
| Molar ratio of terephthalic acid ethylene glycol | 1:2 | 1:1.8 | 1:1.4 |
| Catalyst ($Sb_2O_3$) | 5.4 | 4.3 | 5.3 |
| Vapours leaving the top of reactor: | | | |
| R1: | | | |
| Glycol | 4,370 | 2,839 | [1] 1,168 |
| Water | 2,762 | 2,200 | 2,675 |
| R2: | | | |
| Glycol | 133 | 63 | 1,275 |
| Water | 88 | 67 | 111 |
| R3: | | | |
| Glycol | 293 | 164 | 281 |
| Water | 49 | 30 | 46 |
| R4: | | | |
| Glycol | 78 | 124 | 176 |
| Water | 14 | 10 | 13 |

[1] Operating with partial stripping of the vapours and recycling of the glycol inside the reactor.

Operating according to Example 2.

| | Trial | | |
|---|---|---|---|
| | d | e | f |
| Contents of the feed mixture: | | | |
| Ethylene glycol | 9,290 | 7,890 | 6,500 |
| Dimethylterephthalate | 14,700 | 14,700 | 15,800 |
| Molar ratio of the dimethylterephthalate to the ethylene glycol | 1:2 | 1:1.7 | 1:1.3 |
| Catalyst (zinc acetate) | 3.3 | 3.3 | 3.6 |
| Catalyst ($Sb_2O_3$) | 5.0 | 5.0 | 5.4 |
| Vapours leaving the top of reactor: | | | |
| R1: | | | |
| Glycol | 3,210 | [1] 1,711 | [1] 43 |
| Methanol | 4,521 | 4,413 | 4,653 |
| R2: | | | |
| Glycol | 1,013 | 1,110 | 1,000 |
| Methanol | 230 | 326 | 416 |
| R3: | | | |
| Glycol | 264 | 265 | 285 |
| Methanol | 34 | 39 | 46 |
| R4: | | | |
| Glycol | 73 | 94 | 79 |
| Methanol | 10 | 15 | 10 |

[1] Operating with partial or total stripping of the vapours and recycling the glycol inside the reactor.

Referring again to FIG. 2, it can be observed that the second precondensation reactor, which is indicated by R4, can advantageously include in its turn a system of thermal and material exchange of the liquid film type, produced by means of a centrifugal device 120, of a type similar to that previously described. In this reactor the presence of a recirculation system is not required in practice and consequently it is omitted in the diagram. However it obviously includes a system 121 for the evacuation of the glycol which is liberated by the effect of the condensation, and is associated in particular with a glycol spray system of condensation.

What is claimed is:

1. A process for the continuous production of polyesters, which comprises esterifying a dicarboxylic compound by mixing said compound with an alkene glycol, distributing said mixture in the form of a liquid film over an area while heating said area to maintain a temperature at the interface of said area no more than 10° below the thermal threshold of the liquid to heat the liquid film to such temperature by conduction and convection, collecting the reacted product and separating it into two streams of differing volume, recirculating the greater stream back to mix it with the starting mixture, and transferring the rest of the reacted product to effect polymerization thereof.

2. Process as claimed in claim 1, wherein the thermal gradient relative to the thermal threshold of the liquid is limited to a value not greater than 6° C.

3. Process as claimed in claim 1 wherein the quantity of recycled reacted product is at least five times the quantity of the reacted product removed and transferred for polymerization.

4. Process as claimed in claim 1 which comprises at least the three successive phases of (a) formation of the product of esterification or transesterification of the dicarboxylic compound (acid or diester) with the ethylene glycol, and partial formation of precondensates, (b) completion of the formation of the said product and continuation of the precondensation, and (c) completion of the said precondensate, in each of which phases the contribution of heat furnished from the outside to the reaction mass is achieved by thermal exchange between the said area and the said liquid film.

5. Process as claimed in claim 4 wherein in phase (a) the ratio of the quantity of reacted product removed and the excess recirculated lies between $1/30$ and $1/100$.

6. Process as claimed in claim 4, wherein in phase (b), the ratio of the quantity of precondensate removed to the excess recirculated lies between $1/20$ and $1/80$.

7. Process as claimed in claim 4, wherein in phase (c), the ratio of the quantity of precondensate removed to the excess recirculated lies between $1/5$ and $1/40$.

8. Process as claimed in claim 4, in which the said phase (a) includes the esterification of a dicarboxylic acid with ethylene glycol, and the average temperatures of the liquid film in said phase (a) are between 245° C. and 294° C. and in phase (b) are between 250° C. and 285° C. and in phase (c) are between 270° C. and 290° C., and the surfaces with which the respective liquid films are in contact, are maintained by heating them from the outside, at a temperature not greater than 300° C. in phase (a), 290° C. in phase (b) and 296° C. in phase (c), respectively.

9. Process as claimed in claim 8, wherein the environments in which the said phases take place are maintained at internal pressures for phase (a) lying between 4 and 6 atm. and for phase (b) between 1 and 2 atm. and for phase (c) between 40 and 150 mm. of Hg residual respectively.

10. Process as claimed in claim 4, in which phase (a) includes the transesterification of a diester of a dicarboxylic acid with ethylene glycol, the average temperatures of the liquid film for phase (a) are contained between 180° C. and 275° C. and for phase (b) between 220° C. and 285° C. and for phase (c) between 270° C. and 290° C. respectively, and the areas with which the respective liquid films are in contact are maintained, by means of a contribution of thermal energy from the outside, at a temperature not greater for phase (a) than 280° C. and for phase (b) 290° C. and for phase (c) 296° C. respectively.

11. Process as claimed in claim 10, wherein the environments in which the said phases take place, are maintained at internal pressures lying for phase (a) between 1 and 6 atm., and for phase (b) between 1 and 2 atm. and for phase (c) between 40 and 150 mm. Hg residual respectively.

12. Process as claimed in claim 4, wherein the flow rate of the reacted product removed is controlled so the respective retention times lie between 100 and 20 minutes for phase (a) and between 30 and 10 minutes for phase (b) and between 30 and 15 minutes for phase (c), respectively.

13. A process for the continuous production of polyesters, which comprises mixing a dicarboxylic compound with ethylene glycol, distributing the mixture in the form of a liquid film on the inside wall of a reaction vessel so that the film flows down said inside wall while heating said wall to maintain a temperature at the interface of said wall no more than 10° below the thermal threshold of the liquid to heat the film to such temperature, collecting the reacted product at the bottom of the reaction vessel and separating it into two streams of differing volume, one of which is five times greater than the other, and recirculating the greater stream back into the reaction vessel to mix it with the starting mixture, and transferring the rest of the reacted product to effect polymerization thereof.

14. Process as claimed in claim 13, wherein the internal surface of the vessel is maintained at a temperature between 271° C. and 296° C., the temperature of the liquid film is maintained between 270° C. and 290 C., and the internal pressure of the vessel is maintained between 5 and 30 mm. Hg residual.

References Cited

UNITED STATES PATENTS

| 3,496,146 | 2/1970 | Mellichamp | 260—75 |
| 3,497,473 | 2/1970 | Kemkes | 260—75 |
| 3,506,622 | 4/1970 | Higgins | 260—75 |
| 3,167,531 | 1/1965 | Parker et al. | 260—75 |
| 3,192,184 | 6/1965 | Brill et al. | 260—75 |
| 3,241,926 | 3/1966 | Parker et al. | 23—283 |
| 3,260,703 | 7/1966 | Coggeshall | 260—78 |
| 3,316,064 | 4/1967 | Kuzuoka et al. | 23—283 |
| 3,359,074 | 12/1967 | Dobo | 23—283 |
| 3,427,287 | 2/1969 | Pengilly | 260—75 |

FOREIGN PATENTS

| 1,436,969 | 3/1966 | France. |
| 1,484,494 | 5/1967 | France. |
| 1,136,455 | 12/1968 | Great Britain. |
| 553,585 | 2/1958 | Canada. |
| 783,594 | 4/1968 | Canada. |
| 28,259 | 12/1965 | Japan. |

MELVIN GOLDSTEIN, Primary Examiner

U.S. Cl. X.R.

23—285; 260—475 P